(12) United States Patent
Moriwaki et al.

(10) Patent No.: US 11,243,124 B2
(45) Date of Patent: Feb. 8, 2022

(54) HEAT FLUX MEASUREMENT SYSTEM

(71) Applicant: MITSUBISHI HEAVY INDUSTRIES, LTD., Tokyo (JP)

(72) Inventors: Atsushi Moriwaki, Tokyo (JP); Ryo Yoshino, Tokyo (JP); Hiroshi Makigano, Tokyo (JP); Koichi Tanimoto, Tokyo (JP)

(73) Assignee: MITSUBISHI HEAVY INDUSTRIES, LTD, Tokyo (JP)

( * ) Notice: Subject to any disclaimer, the term of this patent is extended or adjusted under 35 U.S.C. 154(b) by 8 days.

(21) Appl. No.: 16/766,540

(22) PCT Filed: Nov. 28, 2018

(86) PCT No.: PCT/JP2018/043784
§ 371 (c)(1),
(2) Date: May 22, 2020

(87) PCT Pub. No.: WO2019/107410
PCT Pub. Date: Jun. 6, 2019

(65) Prior Publication Data
US 2020/0378843 A1 Dec. 3, 2020

(30) Foreign Application Priority Data
Nov. 30, 2017 (JP) .............................. JP2017-231032

(51) Int. Cl.
*G01K 17/00* (2006.01)
*G01K 7/00* (2006.01)
(Continued)

(52) U.S. Cl.
CPC ............. *G01K 17/08* (2013.01); *G01N 25/18* (2013.01); *G01N 25/20* (2013.01)

(58) Field of Classification Search
USPC .................................... 374/29, 179, 110, 166
See application file for complete search history.

(56) References Cited

U.S. PATENT DOCUMENTS

| 4,577,976 A * | 3/1986 | Hayashi ................. G01N 25/18 374/29 |
| 2012/0243571 A1* | 9/2012 | Ikeda ..................... G01K 17/00 374/30 |

(Continued)

FOREIGN PATENT DOCUMENTS

| CN | 105358949 | 2/2016 |
| CN | 106461471 | 2/2017 |

(Continued)

OTHER PUBLICATIONS

International Search Report dated Feb. 19, 2019 in International (PCT) Application No. PCT/JP2018/043784 with English-language translation.

(Continued)

*Primary Examiner* — Mirellys Jagan
(74) *Attorney, Agent, or Firm* — Wenderoth, Lind & Ponack, L.L.P.

(57) ABSTRACT

A heat flux measurement system includes a first wire, a first heat flux sensor singly provided in the middle of the first wire, a second wire including a first end connected to the first wire at a position closer to a first end of the first wire than the first heat flux sensor in which the second wire is formed of the same material as that of the first wire, a second heat flux sensor singly provided in the middle of the second wire, a first detection unit detecting a voltage between opposite ends of the first wire, and a second detection unit detecting a voltage between the first end of the first wire and a second end of the second wire.

14 Claims, 9 Drawing Sheets

(51) Int. Cl.
    *G01K 3/00*     (2006.01)
    *G01K 17/08*     (2006.01)
    *G01N 25/18*     (2006.01)
    *G01N 25/20*     (2006.01)

(56) References Cited

U.S. PATENT DOCUMENTS

2017/0082564 A1    3/2017  Shiraishi et al.
2017/0211990 A1    7/2017  Gouko et al.

FOREIGN PATENT DOCUMENTS

| CN | 106461472 | 2/2017 |
| JP | 2004-37097 | 2/2004 |
| JP | 2009-29085 | 2/2009 |
| JP | 2013-59847 | 4/2013 |
| JP | 5619183 | 9/2014 |
| WO | 2011/094658 | 8/2011 |
| WO | 2014/194077 | 12/2014 |

OTHER PUBLICATIONS

Written Opinion of The International Searching Authority dated Feb. 19, 2019 in International (PCT) Application No. PCT/JP2018/043784 with English-language translation.

\* cited by examiner

HEAT FLUX MEASUREMENT SYSTEM

TECHNICAL FIELD

The present invention relates to a heat flux measurement system that measures heat flux at a plurality of positions.

This application claims the benefit of Japanese Patent Application No. 2017-231032, filed on Nov. 30, 2017, which is hereby incorporated by reference herein in its entirety.

BACKGROUND ART

In the related art, a heat flux sensor that detects, in order to learn a heating state (or a cooling state) of each of parts of a member, a temperature of each part by a thermocouple being buried in each of the parts and measures heat flux of each part from the temperature is known.

For example, a monitoring device using such a heat flux sensor is disclosed in Japanese Unexamined Patent Application Publication No. 2009-29085. In the device disclosed in Japanese Unexamined Patent Application Publication No. 2009-29085, as thermocouples are provided at positions of two different points in a heating barrel and the thermocouples are connected to each other, a voltage signal corresponding to a temperature difference between the two points is obtained. Compared to a case where temperatures are calculated from the respective thermocouples at the two different points in the heating barrel and then heat flux is obtained from a difference between the temperatures obtained by the respective thermocouples through this method, a method for accurately acquiring heat flux between the two different points in the heating barrel is disclosed.

CITATION LIST

However, in order to more accurately learn the heating state (or the cooling state) of the member, it is necessary to learn the entire heat flux distribution of a heating member (measuring target) in addition to measuring the heat flux of each part.

An object of the present invention is to provide a heat flux measurement system that can obtain heat flux distribution of a measuring target with a smaller number of wires.

SUMMARY OF THE INVENTION

According to a first aspect of the present invention, there is provided a heat flux measurement system including a first wire, a first heat flux sensor that is provided only one in a middle of the first wire, a second wire that has a first end, which is connected to a first end side from the first heat flux sensor of the first wire, and is made of the same material as the first wire, a second heat flux sensor that is provided only one in a middle of the second wire, a first detecting unit that detects a voltage between both ends of the first wire, and a second detecting unit that detects a voltage between a first end of the first wire and a second end of the second wire.

In such a heat flux measurement system, as the second wire is branched from the first end side from the first heat flux sensor of the first wire and the second heat flux sensor is provided in the middle of the second wire, a voltage corresponding to only the first heat flux sensor can be obtained by the first detecting unit, and a voltage corresponding to only the second heat flux sensor can be obtained by the second detecting unit. That is, each of the detecting units does not detect a voltage in a state where voltages from a plurality of sensors are mixed. Accordingly, it is possible to measure heat flux at the plurality of positions while minimizing the number of wires.

In addition, in the heat flux measurement system, each of the first heat flux sensor and the second heat flux sensor may have a sensor body that is a thermal resistor and a thermocouple that is continuously disposed over a front surface and a back surface of the sensor body and includes a plurality of contact points on the front surface and the back surface. The thermocouple of the first heat flux sensor may be connected to the first wire. The thermocouple of the second heat flux sensor may be connected to the second wire.

As one continuous thermocouple having the plurality of contact points is provided on the front surface and the back surface of the sensor body in each heat flux sensor, each of the detecting units can accurately and easily detect a voltage caused by a temperature difference between the front surface and the back surface of the sensor body. That is, heat flux can be more accurately and easily measured compared to a case where thermocouples are separately provided on the front surface and the back surface to detect a voltage and heat flux is measured by calculating a voltage difference between the front surface and the back surface.

In addition, in the heat flux measurement system, the number of the contact points disposed on the front surface of the sensor body may be the same as the number of the contact points disposed on the back surface.

As the numbers of contact points are made the same on the front surface and the back surface of the sensor body, a voltage generated by each heat flux sensor is a value proportional to a difference between a temperature of the front surface and a temperature of the back surface of the sensor body. Accordingly, as the voltage is detected, it is possible to more accurately measure heat flux at a position of each heat flux sensor.

In addition, in the heat flux measurement system, the numbers of contact points of the first heat flux sensor and the second heat flux sensor may be set such that voltages detected by the first detecting unit and the second detecting unit are smaller than a maximum allowable voltage for the first detecting unit and the second detecting unit.

As the number of the contact points increases, a numerical value of a voltage generated by the thermocouple increases. Accordingly, the number of the contact points in each heat flux sensor at a position where greater heat flux (temperature difference between the front surface and the back surface of the sensor body) occurs in a measuring target is set such that exceeding an upper limit of a voltage that can be detected by each detecting unit is avoided, and the number of the contact points in each heat flux sensor at a position where smaller heat flux (temperature difference between the front surface and the back surface of the sensor body) occurs is made large up to an upper limit of a voltage that can be detected by each detecting unit. Therefore, it is possible to improve the accuracy of measurement.

In addition, in the heat flux measurement system, the contact points disposed on the front surface of the sensor body and the contact points disposed on the back surface of the sensor body may be provided side by side in a direction of heat flux, which is a measuring target.

As the contact points disposed on the front surface of the sensor body and the contact points disposed on the back surface of the sensor body are arranged in the direction of heat flux, it is possible to further improve the measurement accuracy of the heat flux.

In addition, in the heat flux measurement system, the first wire and the second wire may be made of a material different from the thermocouple.

As a material different from the thermocouple is used for the first wire and the second wire as described above, an inexpensive material can be used for the first wire and the second wire. Therefore, the costs of the heat flux measurement system can be reduced.

In addition, in the heat flux measurement system, the thermocouple may have a first metal wire and a second metal wire which are joined by the contact point. The first wire and the second wire may be connected to the first metal wire and be made of the same material as the first metal wire.

As the first wire and the second wire made of a material that is the same as a material for the thermocouple are provided, a connection part between different types of metals of each wire and each sensor is not formed near a measuring target. In general, electromotive forces generated at the connection part between the thermocouple and the first wire (second wire) at two points (the first end side and the second end side) cancel out each other in a case where it is assumed that temperatures of the two points of the connection part are the same. However, temperature distribution is likely to be formed around a measuring target, and in a case where a temperature difference occurs between the two points of the connection part, a difference occurs between the electromotive forces generated at the two points of the connection part, thereby causing a measurement error. Therefore, in a case where the same material as the first metal wire of the thermocouple is used for the first wire and the second wire, the first wire, the second wire, and the thermocouple are not made of different materials. Therefore, such electromotive forces are not generated. For this reason, an error does not occur. Accordingly, the generation of an electromotive force at a connection part between the thermocouple and the first wire (second wire) can be suppressed, and it is possible to improve the measurement accuracy of heat flux.

In addition, in the heat flux measurement system, an electrical lead that connects the first wire to the first detecting unit and connects the second wire to the second detecting unit may be further included. The electrical lead may be made of the same material as the first wire, the second wire, and the first metal wire.

As such an electrical lead is provided, the first detecting unit and the second detecting unit can be provided at positions separated away from each heat flux sensor, that is, positions separated away from a target of which heat flux is to be measured. In this case, a position where the electrical lead that extends from both ends of the first wire and the second wire is connected to the first detecting unit and the second detecting unit can be provided at a position separated away from the target of which heat flux is to be measured. For this reason, positions where the electrical lead is connected to the first detecting unit and the second detecting unit are unlikely to receive an effect of heat of the target to be measured, and a temperature difference between the electrical leads extending from both ends of the first wire and the second wire is unlikely to occur. Accordingly, even when connection parts between different types of metals are formed at the positions where the electrical lead is connected to the first detecting unit and the second detecting unit and even when an electromotive force is generated at the position, the electromotive forces at the respective connection parts cancel out each other, and a heat flux measurement accuracy can be improved.

In addition, in the heat flux measurement system, an electrical lead that connects the first wire to the first detecting unit and connects the second wire to the second detecting unit may be further included. The electrical lead may include a first electrical lead that is made of the same material as the first wire, the second wire, and the first metal wire and is connected to the first wire and the second wire, and a second electrical lead that is made of a material different from the first wire, the second wire, and the first metal wire and connects the first electrical lead to the first detecting unit and the second detecting unit.

As such an electrical lead is provided, the first detecting unit and the second detecting unit can be provided at positions separated away from each heat flux sensor, that is, positions separated away from a target of which heat flux is to be measured. In this case, also a connecting position between the first electrical lead and the second electrical lead can be provided at a position separated away from the target of which heat flux is to be measured. For this reason, a connecting position between the first electrical lead and the second electrical lead is unlikely to receive an effect of heat of the target to be measured, and a temperature difference between the first electrical leads extending from both ends of the first wire and the second wire is unlikely to occur at a position where the first electrical lead is connected to the second electrical lead. Accordingly, even when connection parts between different types of metals are formed at connecting position between the first electrical lead and the second electrical lead and even when an electromotive force is generated at the positions, electromotive forces at the respective connection parts cancel out each other, and a heat flux measurement accuracy can be improved.

Further, in this case, since an inexpensive material different from the material for the thermocouple can be used for the second electrical lead, the costs of the heat flux measurement system can be reduced, compared to a case where the material for the thermocouple, which is the same as the first electrical lead, is used for the second electrical lead.

In addition, in the heat flux measurement system, at least one of the first wire and the second wire may be provided with an auxiliary wire that is connected at a position where the first heat flux sensor and the second heat flux sensor are not provided and is made of a material different from the first wire and the second wire.

As such an auxiliary wire is provided, each of a combination of the auxiliary wire and the first wire connected to the auxiliary wire and a combination of the auxiliary wire and the second wire connected to the auxiliary wire functions as the thermocouple. Therefore, as the auxiliary wire is provided, the contact points of the thermocouple can be provided on a circuit of the heat flux measurement system configured by the first wire and the second wire. Accordingly, the distribution of heat flux of a measuring target can be measured, and it is possible to measure temperature distribution of the measuring target.

In addition, in the heat flux measurement system, a measurement equipment that is connected to the first detecting unit and the second detecting unit may be further included. The measurement equipment may be selectively switchable as to taking in a voltage between the first detecting unit and the second detecting unit.

The first detecting unit detects a voltage between both ends of the first wire, and the second detecting unit detects a voltage between the first end of the first wire and the second end of the second wire. That is, at the time of voltage detection, both of the detecting units are connected to the first end of the first wire, and share the first end of the first wire. Therefore, as the measurement equipment is switchable as to taking in a voltage between the detecting units, each of the detecting units can easily detect a voltage and measure heat flux of a measuring target at a position of each heat flux sensor.

In addition, in the heat flux measurement system, the measurement equipment may have a plurality of measuring units of which a measurement accuracy differs according to a range of a voltage detected by each of the first detecting unit and the second detecting unit. A measuring unit, which is capable of measuring a value of the voltage detected by each of the first detecting unit and the second detecting unit with the highest accuracy may be selectable according to the value of the voltage.

Even when a voltage detected by each of the detecting units is small, it is possible for the measuring units that can perform measurement corresponding to the voltage to accurately measure heat flux of a measuring target as the plurality of measuring units of which the measurement accuracy differs are provided in this manner.

In addition, the heat flux measurement system may further include a third wire that has a first end, which is connected to a second end side from the second heat flux sensor of the second wire, and is made of the same material as the first wire, a third heat flux sensor that is provided only one in a middle of the third wire, and a third detecting unit that detects a voltage between the second end of the second wire and a second end of the third wire.

As described above, as the third wire is provided to be branched from the second wire and the third heat flux sensor is provided in the third wire, it possible to measure heat flux at a larger number of positions while minimizing the number of wires.

In addition, the heat flux measurement system may further include a fourth wire that has a first end, which is connected at a position on the second end side from the second heat flux sensor of the second wire and closer to the second heat flux sensor than the first end of the third wire, and is made of the same material as the first wire, a fourth heat flux sensor that is provided only one in a middle of the fourth wire, and a fourth detecting unit that detects a voltage between the second end of the second wire and a second end of the fourth wire.

As described above, as the fourth wire is further provided to be branched from the second wire and the fourth heat flux sensor is provided in the fourth wire, it possible to measure heat flux at a larger number of positions while minimizing the number of wires.

Advantageous Effects of Invention

In the heat flux measurement system described above, heat flux distribution of a measuring target can be obtained with a smaller number of wires.

DESCRIPTION OF EMBODIMENTS

First Embodiment

Hereinafter, a heat flux measurement system 100 according to a first embodiment of the present invention will be described.

Figure 1:
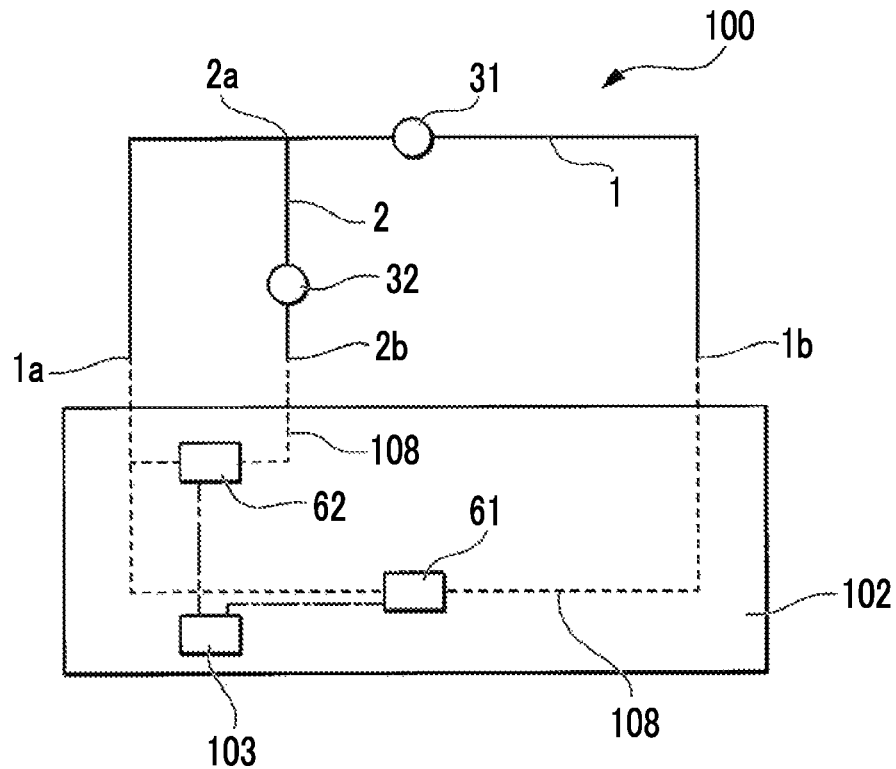
FIG. 1 is an overall diagram of a heat flux measurement system according to a first embodiment of the present invention.

As shown in FIG. 1, the heat flux measurement system 100 includes a first wire 1, a second wire 2 branched from the first wire 1, a first heat flux sensor 31 and a first detecting unit 61, which are connected to the first wire 1, a second heat flux sensor 32 and a second detecting unit 62, which are connected to the second wire 2, and a measurement equipment 102 which accommodates the first detecting unit 61 and the second detecting unit 62.

The first wire 1 is, for example, a metal wire made of copper.

The first heat flux sensor 31 is provided on a measuring target (not shown), and can measure heat flux of the measuring target which is at a position where the first heat flux sensor 31 is provided. Only one first heat flux sensor 31 is provided in the middle of the first wire 1.

Figure 2:
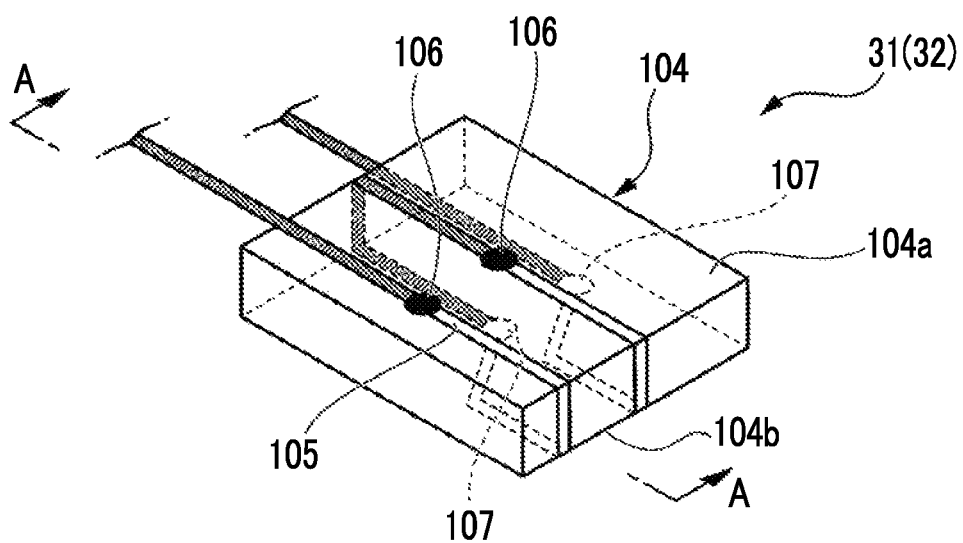
FIG. 2 is an enlarged perspective view illustrating a heat flux sensor in the heat flux measurement system according to the first embodiment of the present invention.

Specifically, as illustrated in FIG. 2, the first heat flux sensor 31 has a panel-shaped sensor body 104 and a thermocouple 105 that is continuously disposed over a front surface 104a and a back surface 104b of the sensor body 104. The first heat flux sensor 31 measures heat flux passing through the sensor body 104.

The sensor body 104 is a panel-shaped thermal resistor, and is made of a material having a known heat transfer coefficient, for example, a ceramics-based material (yttria-stabilized zirconia (YSZ)).

Although it is possible to use, for example, a chomel-alumel thermocouple as the thermocouple 105, a thermocouple made of other materials such as a platinum-based material may be used, or other thermocouples specified in JIS and any thermocouple that is formed by joining different types of metals and is capable of estimating a temperature may be used. The thermocouple 105 is continuously disposed over the front surface 104a and the back surface 104b of the sensor body 104, and includes a plurality of contact points 106 and 107 on the front surface 104a and the back surface 104b. That is, a chromel wire and an alumel wire are joined on the front surface 104a and the back surface 104b of the sensor body 104, and the joined points are the contact points 106 and 107. Both ends of the thermocouple 105 are configured by any one metal wire of the chromel wire and the alumel wire, and are connected to the first wire 1 and the second wire 2.

Although the number of the contact points 106 disposed on the front surface 104a and the number of the contact points 107 disposed on the back surface 104b of the sensor body 104 are the same in the embodiment, the number of the contact points 106 on the front surface 104a and the number of the contact points 107 on the back surface 104b may be different from each other.

Figure 3:
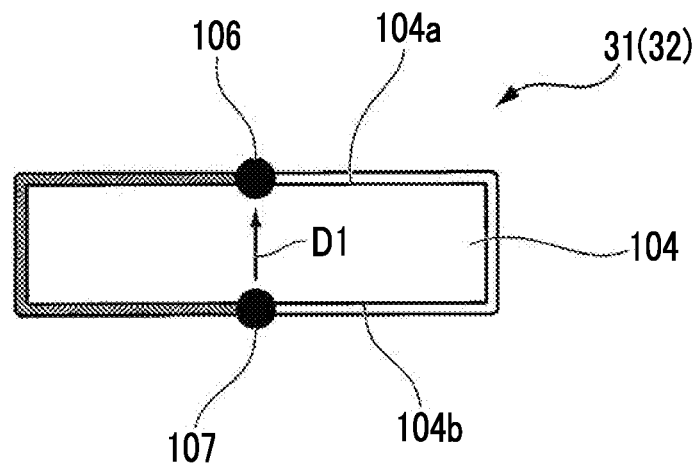
FIG. 3 is a view illustrating the heat flux sensor in the heat flux measurement system according to the first embodiment of the present invention, and is a view corresponding to a sectional view taken along line A-A of FIG. 2.

Further, as illustrated in FIG. 3, it is preferable that the contact point 106 disposed on the front surface 104a of the sensor body 104 and the contact point 107 disposed on the back surface 104b of the sensor body 104 are provided side by side in line with a direction D1 of heat flux which is a measuring target. In the embodiment, the front surface 104a and the back surface 104b of the sensor body 104 are parallel to each other, and a direction orthogonal to the front surface 104a and the back surface 104b matches the direction D1 of heat flux. As illustrated in FIG. 2, the contact point 106 on the front surface 104a and the contact point 107 on the back surface 104b may not necessarily have to be arranged in the direction D1 of heat flux which is the measuring target.

As shown in FIG. 1, the second wire 2 is a metal wire made of, for example, copper just as the first wire 1. A first end 2a of the second wire 2 is connected to a first end 1a side from the first heat flux sensor 31 of the first wire 1.

The second heat flux sensor 32 has the same configuration as the first heat flux sensor 31. Only one second heat flux sensor 32 is provided in the middle between the first end 2a and a second end 2b of the second wire 2.

A first detecting unit 61 is a voltmeter that is connected to a first end 1a and a second end 1b of the first wire 1 and detects voltages of both ends of the first wire 1. More specifically, an electrical lead 108 is provided between the first wire 1 and the first detecting unit 61, and the first wire 1 and the first detecting unit 61 are connected to each other via the electrical lead 108. The electrical lead 108 is made of a material different from the thermocouple 105. For example, although the electrical lead 108 is a copper wire, other materials may be used for the electrical lead 108.

The second detecting unit 62 is a voltmeter that is the same as the first detecting unit 61 which detects voltages of both ends of the second wire 2. In the embodiment, the second detecting unit 62 is connected to the first end 1a of the first wire 1 and the second end 2b of the second wire 2, and detects the voltages of both ends of the second wire 2 by detecting a voltage between the first end 1a and the second end 2b. The electrical lead 108 is provided also between the second wire 2 and the second detecting unit 62, and the second wire 2 and the second detecting unit 62 are connected to each other via the electrical lead 108.

The measurement equipment 102 accommodates the first detecting unit 61 and the second detecting unit 62 and has a measuring unit 103 connected to the first detecting unit 61 and the second detecting unit 62.

The measuring unit 103 receives a signal, which is a voltage from each of the detecting units 61 and 62, and transmits the signal to, for example, a personal computer (PC).

In addition, the measuring unit 103 may simultaneously take in voltages from the first detecting unit 61 and the second detecting unit 62, or may be selectively switchable as to taking in a voltage between the first detecting unit 61 and the second detecting unit 62.

In the heat flux measurement system 100 described above, as the second wire 2 is branched from the first end side 1a from the first heat flux sensor 31 of the first wire 1 and the second heat flux sensor 32 is provided in the middle of the second wire 2, a voltage corresponding to only the first heat flux sensor 31 can be obtained by the first detecting unit 61, and a voltage corresponding to only the second heat flux sensor 32 can be obtained by the second detecting unit 62.

That is, each of the detecting units 61 and 62 does not detect a voltage in a state where voltages from a plurality of sensors are mixed. Accordingly, it is possible to measure heat flux of a measuring target at a plurality of positions while minimizing the number of wires, and heat flux distribution of the measuring target can be obtained with a smaller number of wires. In addition, a degree of freedom of a position of a measurement point of heat flux can be improved by selecting various positions where the second wire 2 is branched from the first wire 1.

In addition, as one continuous thermocouple 105 having the plurality of contact points 106 and 107 is provided on the front surface 104a and the back surface 104b of the sensor body 104 in each heat flux sensor, each of the detecting units 61 and 62 can accurately detect a voltage caused by a temperature difference between the front surface 104a and the back surface 104b of the sensor body 104. Accordingly, heat flux can be easily measured from the temperature difference between the front surface 104a and the back surface 104b based on the voltage.

Further, as the numbers of contact points 106 and 107 are made the same on the front surface 104a and the back surface 104b of the sensor body 104, a voltage generated by each heat flux sensor is a value proportional to a difference between a temperature of the front surface 104a and a temperature of the back surface 104b of the sensor body 104. Accordingly, it is possible to more accurately measure heat flux.

In addition, as the contact point 106 disposed on the front surface 104a of the sensor body 104 and the contact point 107 disposed on the back surface 104b of the sensor body 104 are arranged in the direction D1 of heat flux, it is possible to further improve the measurement accuracy of the heat flux.

In addition, the first detecting unit 61 detects a voltage between both ends of the first wire 1, and the second detecting unit 62 detects a voltage between the first end 1a of the first wire 1 and the second end 2b of the second wire 2. That is, at the time of voltage detection, both of the detecting units 61 and 62 are connected to the first end 1a of the first wire 1, and share the first end 1a of the first wire 1 for voltage detection by each detecting unit. In the embodiment, as the measurement equipment 102 switches as to taking in a voltage between the detecting units 61 and 62, the detecting units 61 and 62 can easily detect a voltage and measure heat flux at a position of each heat flux sensor.

The heat flux sensor is not limited to a sensor having the configuration described above, and may be any sensor that can generate a voltage by heat flux passing through the sensor body 104 and measure the heat flux from the voltage.

Second Embodiment

Next, a heat flux measurement system 100A according to a second embodiment of the present invention will be described. In the second embodiment to be described below, the heat flux measurement system 100A further includes a third wire 3, a fourth wire 4, a fifth wire 5, a third heat flux sensor 33, a fourth heat flux sensor 34, a fifth heat flux sensor 35, a third detecting unit 63, a fourth detecting unit 64, and a fifth detecting unit 65, in addition to the configurations of the first embodiment.

Figure 4:
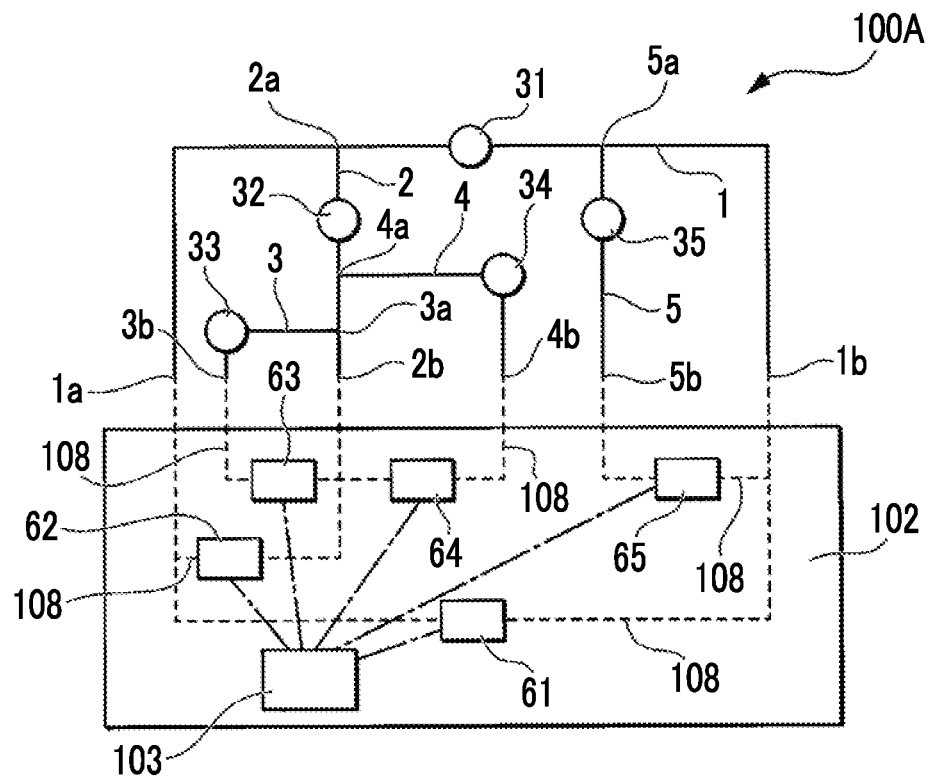
FIG. 4 is an overall diagram of a heat flux measurement system according to a second embodiment of the present invention.

As shown in FIG. 4, the third wire 3 is a metal wire made of, for example, copper just as the first wire 1. A first end 3a of the third wire 3 is connected to the second wire 2 on a second end side 2b of the second wire 2 from a position where the second heat flux sensor 32 is provided in the second wire 2.

The third heat flux sensor 33 has the same configuration as the first heat flux sensor 31. Only one third heat flux sensor 33 is provided in the middle between the first end 3a and a second end 3b of the third wire 3.

The third detecting unit 63 is the same voltmeter as the first detecting unit 61, which is connected to the first end 3a of the third wire 3 via the second wire 2, is connected to the second end 3b of the third wire 3, and detects voltages of both ends of the third wire 3. In the embodiment, the third detecting unit 63 detects voltages of both ends of the third wire 3 by detecting a voltage between the second end 3b of the third wire 3 and the second end 2b of the second wire 2. The electrical lead 108 is provided also between the third wire 3 and the third detecting unit 63, and the third wire 3 and the third detecting unit 63 are connected to each other via the electrical lead 108.

In addition, the fourth wire 4 is a metal wire made of copper just as the first wire 1. A first end 4a of the fourth wire 4 is connected to the second wire 2 at a position on the second end side 2b from the second heat flux sensor 32 of the second wire 2 and closer to the second heat flux sensor 32 than the first end 3a of the third wire 3.

The fourth heat flux sensor 34 has the same configuration as the first heat flux sensor 31. Only one fourth heat flux sensor 34 is provided in the middle between the first end 4a and a second end 4b of the fourth wire 4.

The fourth detecting unit 64 is the same voltmeter as the first detecting unit 61, which is connected to the first end 4a of the fourth wire 4 via the second wire 2, is connected to the second end 4b of the fourth wire 4, and detects voltages of both ends of the fourth wire 4. In the embodiment, the fourth detecting unit 64 detects voltages of both ends of the fourth wire 4 by detecting a voltage between the second end 4b of the fourth wire 4 and the second end 2b of the second wire 2. The electrical lead 108 is provided also between the fourth wire 4 and the fourth detecting unit 64, and the fourth wire 4 and the fourth detecting unit 64 are connected to each other via the electrical lead 108.

In addition, the fifth wire 5 is a metal wire made of copper just as the first wire 1. A first end 5a of the fifth wire 5 is connected to the first wire 1 on the second end side 1b from the first heat flux sensor 31 of the first wire 1.

The fifth heat flux sensor 35 has the same configuration as the first heat flux sensor 31. Only one fifth heat flux sensor 35 is provided in the middle between the first end 5a and a second end 5b of the fifth wire 5.

The fifth detecting unit 65 is the same voltmeter as the first detecting unit 61, which is connected to the first end 5a of the fifth wire 5 via the first wire 1, is connected to the second end 5b of the fifth wire 5, and detects voltages of both ends of the fifth wire 5. In the embodiment, the fifth detecting unit 65 detects voltages of both ends of the fifth wire 5 by detecting a voltage between the second end 5b of the fifth wire 5 and the second end 1b of the first wire 1. The electrical lead 108 is provided also between the fifth wire 5 and the fifth detecting unit 65, and the fifth wire 5 and the fifth detecting unit 65 are connected to each other via the electrical lead 108.

In the heat flux measurement system 100A described above, the third wire 3 is provided to be branched from the second wire 2, and the third wire 3 is provided with the third heat flux sensor 33. The fourth wire 4 is provided to be further branched from the second wire 2, and the fourth wire 4 is provided with the fourth heat flux sensor 34. The fifth wire 5 is provided to be branched from the first wire 1, and the fifth wire 5 is provided with the fifth heat flux sensor 35. Accordingly, it is possible to measure heat flux at a large number of positions while minimizing the number of wires.

Third Embodiment

Next, a heat flux measurement system 100B according to a third embodiment of the present invention will be described. In the third embodiment to be described below, the heat flux measurement system 100B further includes a large number of wires, heat flux sensors, and detecting units (not shown), in addition to the configurations of the first embodiment and the second embodiment.

Figure 5:
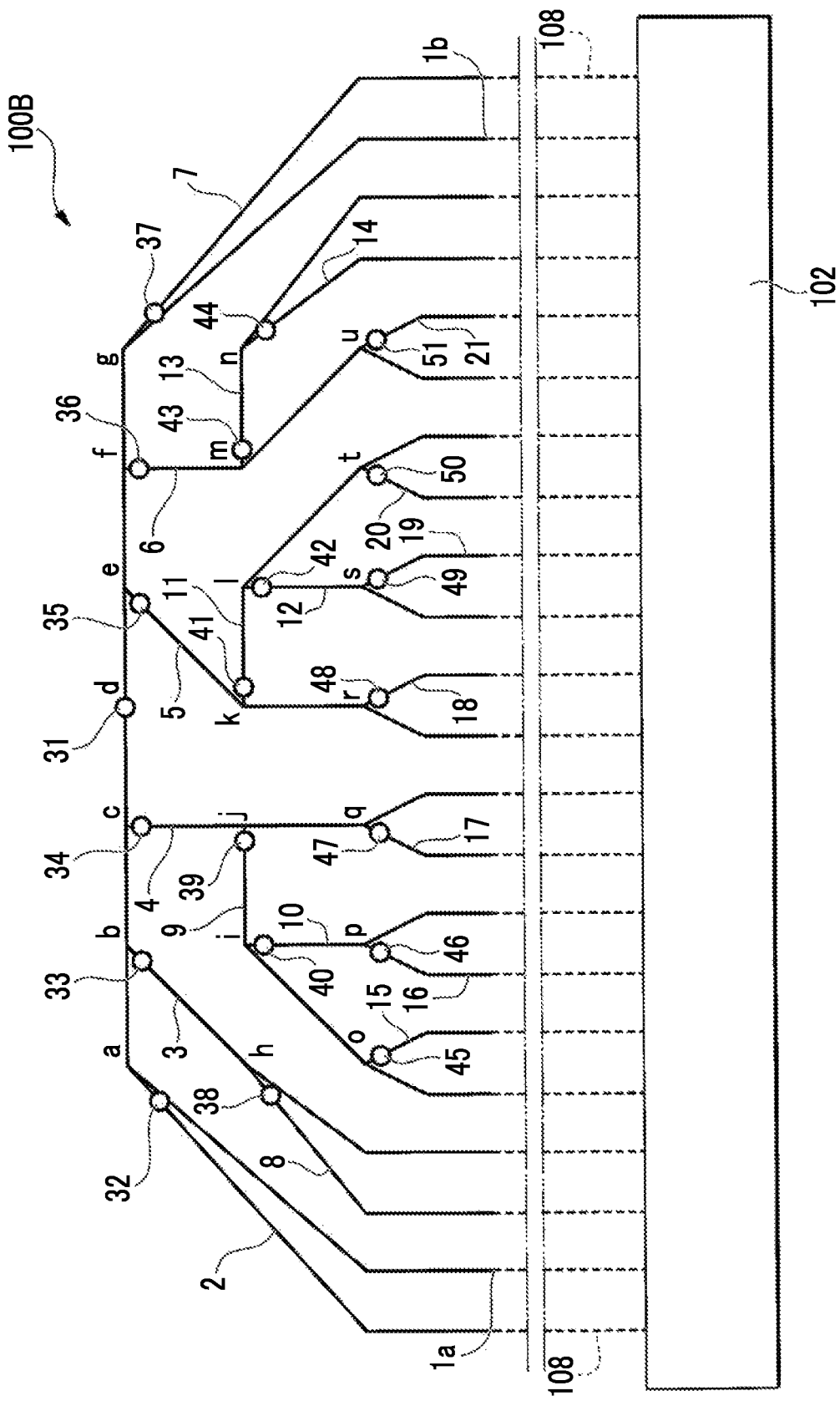
FIG. 5 is an overall diagram of a heat flux measurement system according to a third embodiment of the present invention.

As shown in FIG. 5, the first wire 1 is provided with the first heat flux sensor 31 at a point d between the first end 1a and the second end 1b.

The second wire 2 extends from a point a which is at between the first end 1a and the second end 1b of the first wire 1 and is in the middle on the first end side 1a of the point d. The second heat flux sensor 32 is provided in the middle of the second wire 2.

In addition, the third wire 3 extends from a point b which is on a second end side 1b of the first wire 1 from the point a of the first wire 1 and is on the first end side 1a of the point d. The third heat flux sensor 33 is provided in the middle of the third wire 3.

In addition, the fourth wire 4 extends from a point c which is on the second end side 1b of the first wire 1 from the point b of the first wire 1 and is on the first end side 1a from the point d. The fourth heat flux sensor 34 is provided in the middle of the fourth wire 4.

In addition, the fifth wire 5 extends from a point e which is on the second end side 1b of the first wire 1 from the point d of the first wire 1. The fifth heat flux sensor 35 is provided in the middle.

In addition, a sixth wire 6 extends from a point f which is on the second end side 1b of the first wire 1 from the point e of the first wire 1. The sixth heat flux sensor 36 is provided in the middle of the sixth wire 6.

In addition, a seventh wire 7 extends from a point g which is on the second end side 1b of the first wire 1 from the point f of the first wire 1. A seventh heat flux sensor 37 is provided in the middle of the seventh wire 7.

In addition, an eighth wire 8 extends from a point h in the middle of the third wire 3. The point h is on the third wire 3 at a position on an opposite side to the point b with the third heat flux sensor 33 interposed therebetween. An eighth heat flux sensor 38 is provided in the middle of the eighth wire 8.

In addition, a ninth wire 9 extends from a point j in the middle of the fourth wire 4. The point j is on the fourth wire 4 at a position on an opposite side to the point c with the fourth heat flux sensor 34 interposed therebetween. A ninth heat flux sensor 39 is provided in the middle of the ninth wire 9.

In addition, a tenth wire 10 extends from a point i in the middle of the ninth wire 9. The point i is on the ninth wire 9 at a position on an opposite side to the point j with the ninth heat flux sensor 39 interposed therebetween. A tenth heat flux sensor 40 is provided in the middle of the tenth wire 10.

In addition, an eleventh wire 11 extends from a point k in the middle of the fifth wire 5. The point k is on the fifth wire 5 at a position on an opposite side to the point e with the fifth heat flux sensor 35 interposed therebetween. An eleventh heat flux sensor 41 is provided in the middle of the eleventh wire 11.

In addition, a twelfth wire 12 extends from a point l in the middle of the eleventh wire 11. The point l is on the eleventh wire 11 at a position on an opposite side to the point k with the eleventh heat flux sensor 41 interposed therebetween. A twelfth heat flux sensor 42 is provided in the middle of the twelfth wire 12.

In addition, a thirteenth wire 13 extends from a point m in the middle of the sixth wire 6. The point m is on the sixth wire 6 at a position on an opposite side to the point f with the sixth heat flux sensor 36 interposed therebetween. A thirteenth heat flux sensor 43 is provided in the middle of the thirteenth wire 13.

In addition, a fourteenth wire 14 extends from a point n in the middle of the thirteenth wire 13. The point n is on the thirteenth wire 13 at a position on an opposite side to the point m with the thirteenth heat flux sensor 43 interposed therebetween. A fourteenth heat flux sensor 44 is provided in the middle of the fourteenth wire 14.

In addition, a fifteenth wire 15 extends from a point o in the middle of the ninth wire 9. The point o is on the ninth wire 9 at a position on an opposite side to the ninth heat flux sensor 39 with the point i interposed therebetween. A fifteenth heat flux sensor 45 is provided in the middle of the fifteenth wire 15.

In addition, a sixteenth wire 16 extends from a point p in the middle of the tenth wire 10. The point p is on the tenth wire 10 at a position on an opposite side to the point i with the tenth heat flux sensor 40 interposed therebetween. A sixteenth heat flux sensor 46 is provided in the middle of the sixteenth wire 16.

In addition, a seventeenth wire 17 extends from a point q in the middle of the fourth wire 4. The point q is on the fourth wire 4 at a position on an opposite side to the fourth heat flux sensor 34 with the point j interposed therebetween. A seventeenth heat flux sensor 47 is provided in the middle of the seventeenth wire 17.

In addition, an eighteenth wire 18 extends from a point r in the middle of the fifth wire 5. The point r is on the fifth wire 5 at a position on an opposite side to the fifth heat flux sensor 35 with the point k interposed therebetween. An eighteenth heat flux sensor 48 is provided in the middle of the eighteenth wire 18.

In addition, a nineteenth wire 19 extends from a point s in the middle of the twelfth wire 12. The point s is on the twelfth wire 12 at a position on an opposite side to the point l with the twelfth heat flux sensor 42 interposed therebetween. A nineteenth heat flux sensor 49 is provided in the middle of the nineteenth wire 19.

In addition, a twentieth wire 20 extends from a point t in the middle of the eleventh wire 11. The point t is on the eleventh wire 11 at a position on the opposite side to the point k with the eleventh heat flux sensor 41 interposed therebetween. A twentieth heat flux sensor 50 is provided in the middle of the twentieth wire 20.

In addition, a twenty-first wire 21 extends from a point u in the middle of the sixth wire 6. The point u is on the sixth wire 6 at a position on the opposite side to the point f with the sixth heat flux sensor 36 interposed therebetween. A twenty-first heat flux sensor 51 is provided in the middle of the twenty-first wire 21.

In the heat flux measurement system 100B described above, as the second wire 2 to the twenty-first wire 21 are provided to be branched from the first wire 1 and a heat flux sensor is provided in each wire one by one, it possible to measure heat flux at a larger number of positions while minimizing the number of wires. In particular, it is possible to dispose the wires to spread in a plane, and it is possible to measure distribution of heat flux in a wide range.

Fourth Embodiment

Next, a heat flux measurement system 100C according to a fourth embodiment of the present invention will be described. In the fourth embodiment to be described below, the first wire 1 to the twenty-first wire 21 of the heat flux measurement system 100C are different from the third embodiment.

Figure 6:
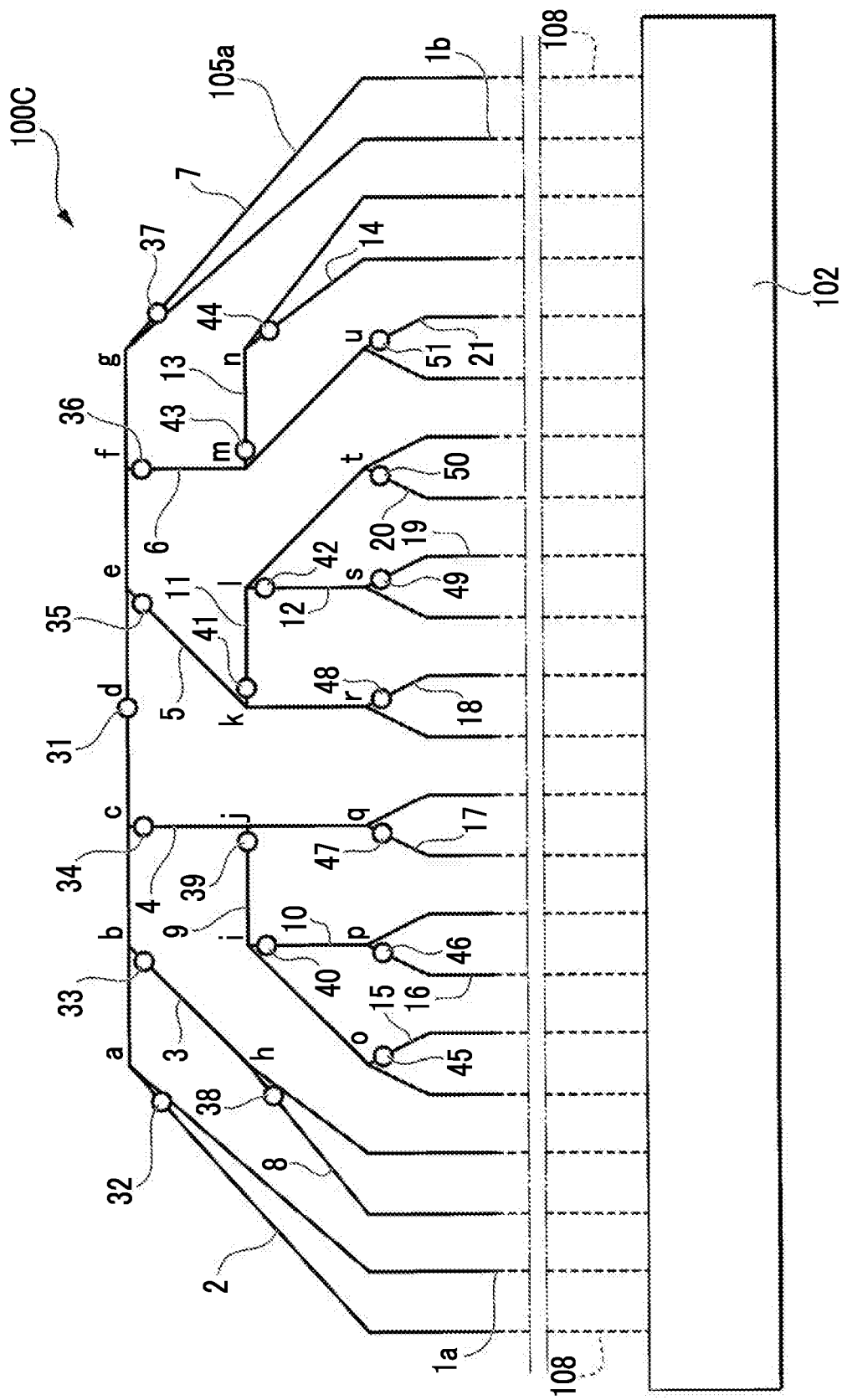
FIG. 6 is art overall diagram of a heat flux measurement system according to a fourth embodiment of the present invention.

In a case where, out of a first metal wire 105a and a second metal wire 105b which are two types of metal wires configuring the thermocouple 105, the first metal wire 105a configures both ends of the thermocouple 105, the first wire 1 to the twenty-first wire 21 are made of the same material as the first metal wire 105a as shown in FIG. 6.

More specifically, when the first metal wire 105a configuring both ends of the thermocouple 105 is a chromel wire, the first wire 1 to the twenty-first wire 21 made of the same material as the chromel wire are provided. In addition, when the first metal wire 105a configuring both ends of the thermocouple 105 is an alumel wire, the first wire 1 to the twenty-first wire 21 made of the same material as the alumel wire are provided.

In the heat flux measurement system 100C described above, as the first wire 1 to the twenty-first wire 21 made of a material that is the same as a material for the thermocouple 105 are provided, a connection part between different types of metals near a measuring target is not formed. Accordingly, the generation of an electromotive force at a joined part between different types of metals can be suppressed, and it is possible to improve a measurement accuracy.

In addition, although different types of metals are connected between the electrical lead 108 and each wire in the embodiment, it is possible to dispose a connection part between the electrical lead 108 and each of the wires 1 to 21 at a position separated from a measuring target (the heat flux sensors 31 to 51). Therefore, the connection part between different types of metals is unlikely to receive an effect of heat from the measuring target, and electromotive forces are canceled out between the connection parts. Accordingly, it is possible to improve a measurement accuracy.

Fifth Embodiment

Next, a heat flux measurement system 100D according to a fifth embodiment of the present invention will be described. In the fifth embodiment to be described below, an electrical lead 108D of the heat flux measurement system 100D is different from the embodiments described above.

Figure 7:
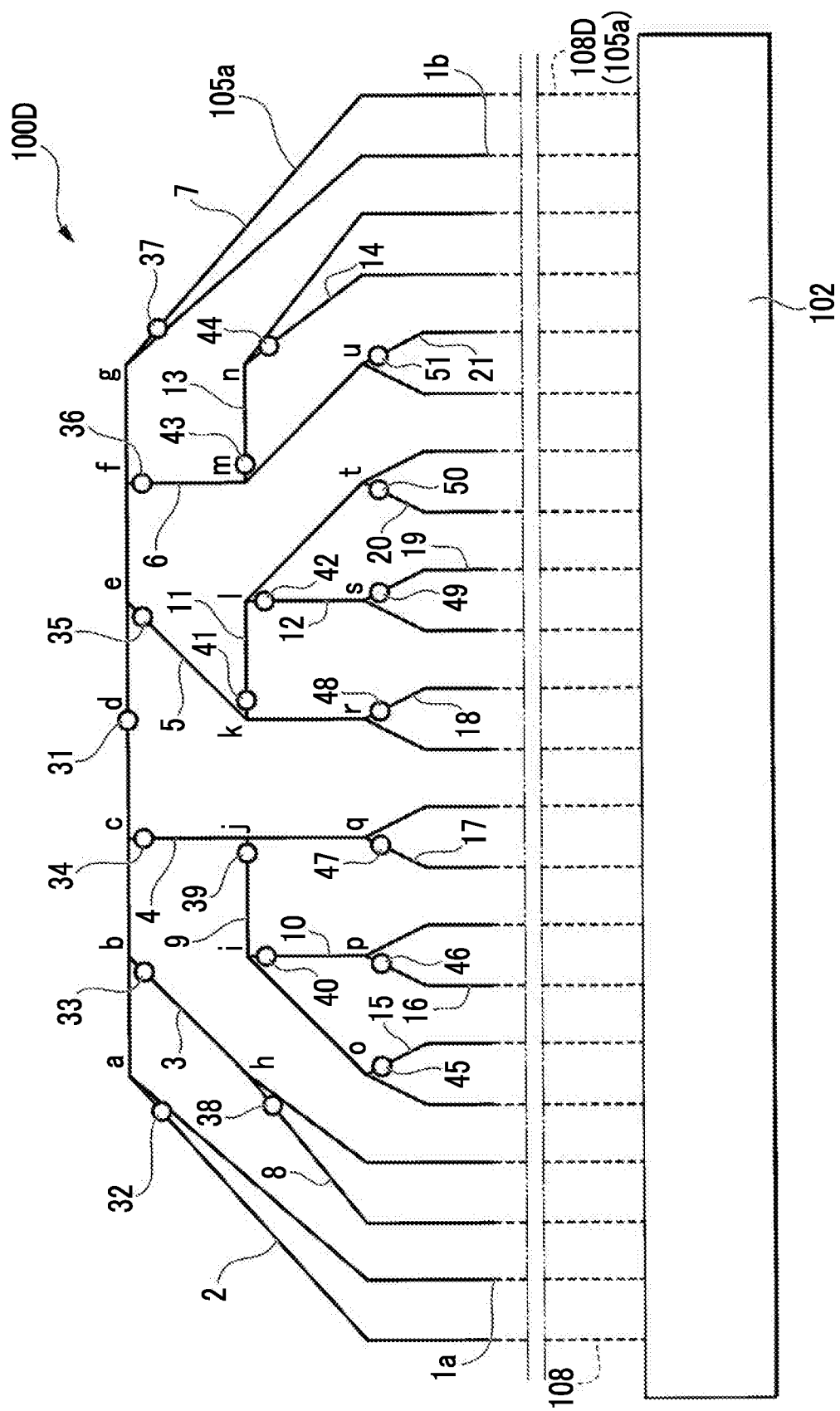
FIG. 7 is an overall diagram of a heat flux measurement system according to a fifth embodiment of the present invention.

As shown in FIG. 7, the electrical lead 108D is made of the same material as the first wire 1 to the twenty-first wire 21.

More specifically, as in the fourth embodiment, when the first metal wire 105a configuring both ends of the thermocouple 105 is a chromel wire, the first wire 1 to the twenty-first wire 21 made of the same material as the chromel wire are provided. In addition, when the first metal wire 105a configuring both ends of the thermocouple 105 is an alumel wire, the first wire 1 to the twenty-first wire 21 made of the same material as the alumel wire are provided.

The electrical lead 108D is also made of the same material as the first metal wire 105a.

In the heat flux measurement system 100D described above, as the electrical lead 106D is provided, each detecting unit can be provided at a position separated away from each heat flux sensor, that is, each detecting unit can be provided at a position separated away from a target of which heat flux is to be measured. In this case, a position where the electrical lead 108D, which is connected to both ends of each wire, is connected to the measurement equipment 102 accommodating each detecting unit can be provided at a position separated away from the target of which heat flux is to be measured.

For this reason, even when a connection part between different types of metals is formed at a position where the electrical lead 108 is connected to the measurement equipment 102, the connection part is unlikely to receive an effect of heat of a measuring target, and a temperature difference between the electrical leads 108D extending from both ends of each wire is unlikely to occur at the connection part. For this reason, even when an electromotive force is generated at a position where the electrical lead 108D is connected to the measurement equipment 102, the electromotive forces at the respective connection parts cancel out each other, and the measurement accuracy of each heat flux sensor can be improved.

Sixth Embodiment

Next, a heat flux measurement system 100E according to a sixth embodiment of the present invention will be described. In the sixth embodiment to be described below, an electrical lead 108E of the heat flux measurement system 100E is different from the embodiments described above.

Figure 8:
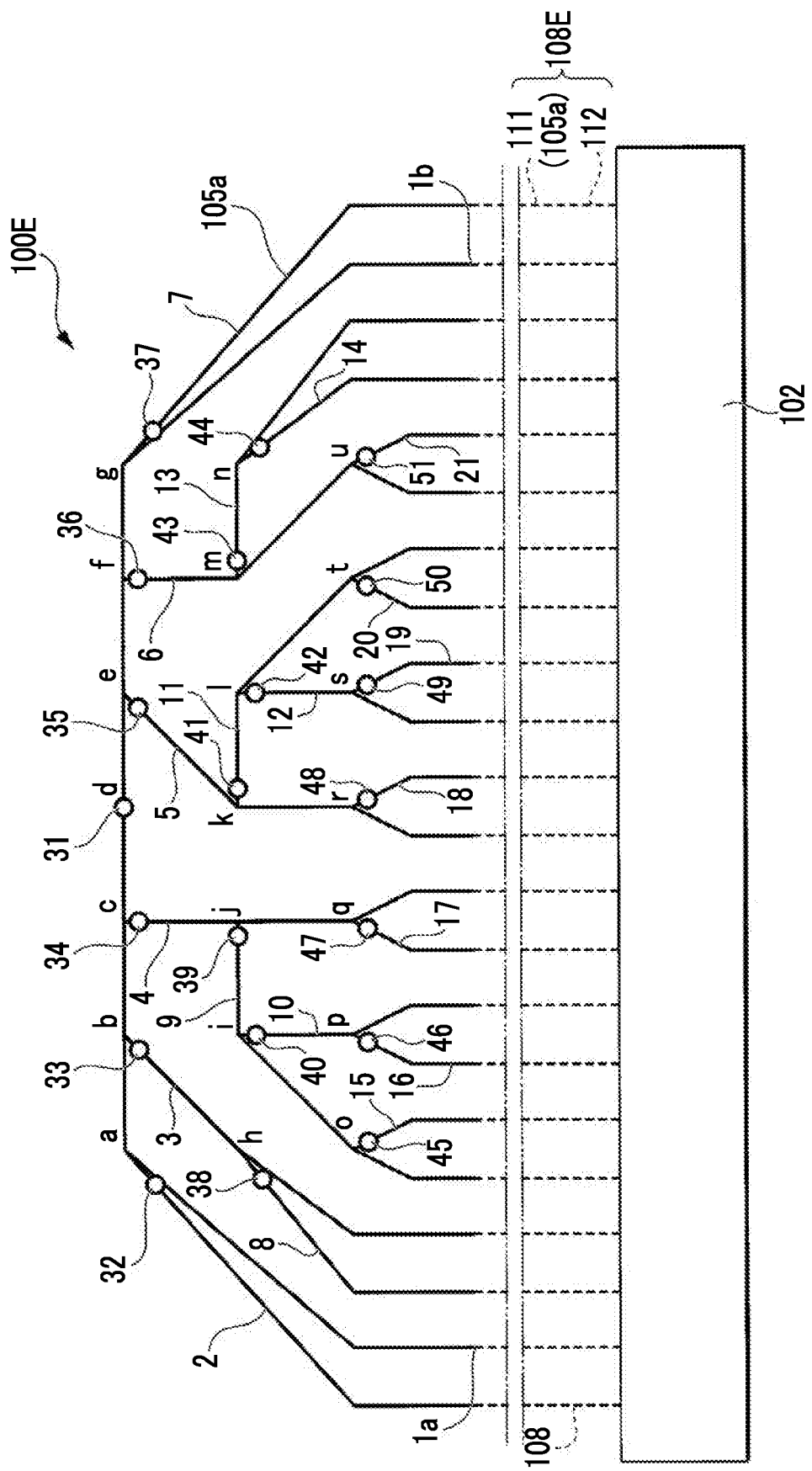
FIG. 8 is an overall diagram of a heat flux measurement system according to a sixth embodiment of the present invention.

As shown in FIG. 8, the electrical lead 108E includes a first electrical lead 111, which is made of the same material as the first, wire 1, the second wire 2, and the first metal wire 105a and is connected to the first wire 1 and the second wire 2, and a second electrical lead 112, which is made of a material different from the first wire 1, the second wire 2, and the first metal wire 105a and connects the first electrical lead 111 to the measurement equipment 102.

In the heat flux measurement system 100E described above, as such an electrical lead 108E is provided, the measurement equipment 102 can be provided at a position separated away from each heat flux sensor, that is, the measurement equipment 102 can be provided at a position separated away from a target of which heat flux is to be measured. In this case, also a connecting position between the first electrical lead 111 and the second electrical lead 112 can be provided at a position separated away from the target of which heat flux is to be measured.

For this reason, even when a connection part between different types of metals is formed at the connection position between the first electrical lead 111 and the second electrical lead 112, the connection part is unlikely to receive an effect of heat of a measuring target, and a temperature difference between the first electrical leads 111 extending from both ends of each wire is unlikely to occur at the connection part. Therefore, even when an electromotive force is generated at the connection part, the electromotive forces at the respective connection parts cancel out each other, and the measurement accuracy of each heat flux sensor can be improved.

Further, in this case, since a material different from the material for the thermocouple 105 can be used for the second electrical lead 112, for example, an inexpensive copper wire can be used for the second electrical lead 112, and the costs of the heat flux measurement system 100E can be reduced, compared to a case where the material for the first metal wire 105a, which is the same as the first electrical lead 111, is used for the second electrical lead 112.

Seventh Embodiment

Next, a heat flux measurement system 100F according to a seventh embodiment of the present invention will be described. In the seventh embodiment to be described below, the measurement equipment 102 of the heat flux measurement system 100F is different from the embodiments described above in that the measurement equipment 102 has a plurality of measuring units 103F.

Figure 9:
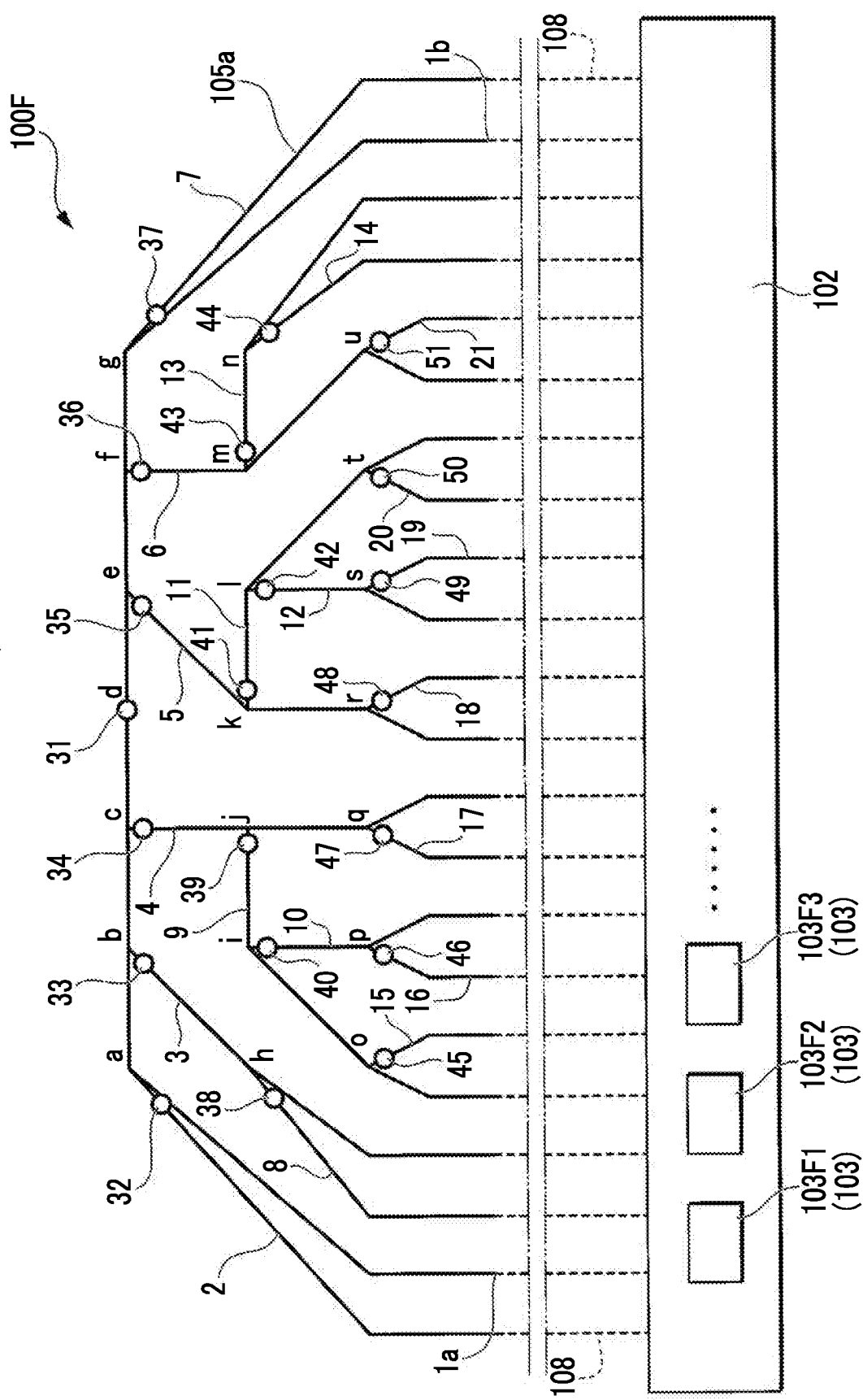
FIG. 9 is an overall diagram of a heat flux measurement system according to a seventh embodiment of the present invention.
Figure 10:
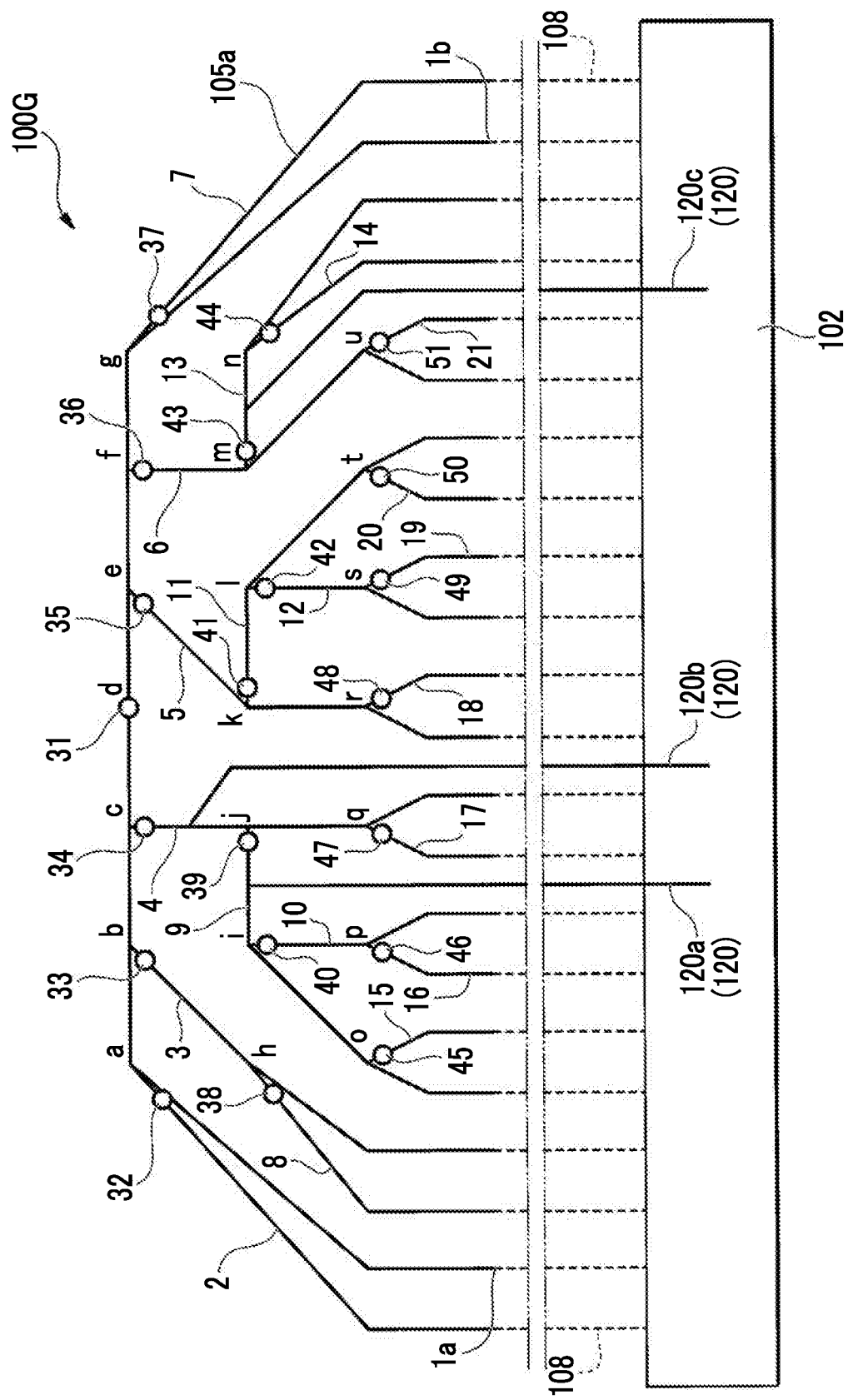
FIG. 10 is an overall diagram of a heat flux measurement system according to an eighth embodiment of the present invention.

As shown in FIG. 9, the measurement equipment 102 has the plurality of measuring units 103E of which a measurement accuracy differs according to a range of a voltage detected by each of the first detecting unit 61 and the second detecting unit 62.

That is, the measurement equipment 102 has a plurality of measuring units 103F1, 103F2, and 103F3 that car measure a value of a voltage with the highest accuracy according to a value of a voltage detected by each detecting unit, and it is possible to select any one of the measuring units 103F according to a value of a voltage detected by each detecting unit.

As the measuring unit 103, a measuring unit having a measurement error with respect to a maximum value of a measurement range is known. In this case, when a measured value is small, heat flux cannot be accurately measured in some cases.

Therefore, in the heat flux measurement system 100F described above, as the plurality of measuring units 103F of which a measurement accuracy differs are provided in this manner, even when a detected voltage is small, it is possible for the measuring units 103F that can perform measurement corresponding to this voltage to accurately measure heat flux.

Eighth Embodiment

Next, a heat flux measurement system 100G according to an eighth embodiment of the present invention will be described. In the eighth embodiment to be described below, the heat flux measurement system 100G further includes an auxiliary wire 120 branched from at least one of the wires 1 to 21. Each of the wires 1 to 21 is made of the same material as the first metal wire 105a configuring the thermocouple 105.

As shown in FIG. 1.0, the auxiliary wire 120 is connected to the wires 1 to 21 at positions where the heat flux sensors 31 to 51 are not provided, and is made of a material different from the wires 1 to 21. For example, when the wires 1 to 21 are chromel wires, the auxiliary wire 120 is an alumel wire. Conversely, when the wires 1 to 21 are alumel wires, the auxiliary wire 120 is a chromel wire.

In the embodiment, for example, as the auxiliary wire 120, a first auxiliary wire 120a having one end connected to the ninth wire 9 between the point i and the ninth heat flux sensor 39, a second auxiliary wire 120b having one end connected to the fourth wire 4 between the point j and the fourth heat flux sensor 34, and a third auxiliary wire 120c having one end connected to the thirteenth wire 13 between the point n and the thirteenth heat flux sensor 43 are provided.

In the heat flux measurement system 100G described above, the auxiliary wire 120 and the wires 1 to 21 connected to the auxiliary wire 120 have a function as a thermocouple. Therefore, as the auxiliary wire 120 is provided, a contact point of the thermocouple can be additionally provided on a circuit of the heat flux measurement system 100G configured by the wires 1 to 21. Accordingly, the distribution of heat flux of a measuring target can be measured, and it is possible to measure temperature distribution of the measuring target.

Ninth Embodiment

Next, a heat flux measurement system 100H according to a ninth embodiment of the present invention will be described. In the ninth embodiment to be described below, each of the heat flux sensors 31 to 51 of the heat flux measurement system 100H is different from the embodiments described above.

Figure 11:
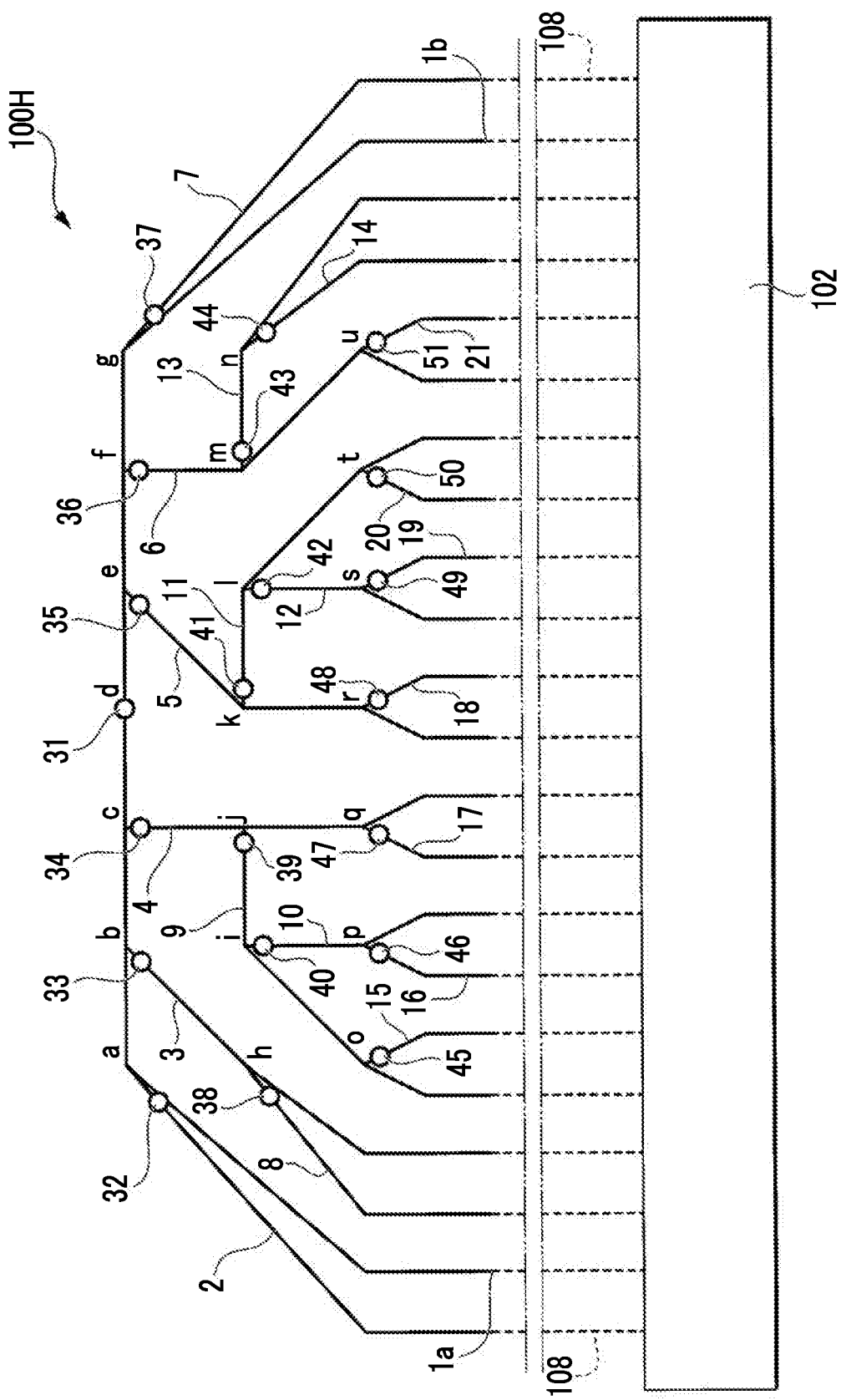
FIG. 11 is an overall diagram of a heat flux measurement system according to a ninth embodiment of the present invention.

As shown in FIG. 11, the heat flux sensors 31 to 51 have different numbers of contact points 106 and 107 (refer to FIG. 2) of the thermocouple 105 from each other. Herein, as the number of the contact points 106 and 107 increases, a numerical value of a voltage generated by the thermocouple 105 increases. The number of the contact points 106 on the front surface 104a and the number of the contact points 107 on the back surface 104b are the same in the embodiment. Thus, the numbers of contact points of the first heat flux sensor 31 and the second heat flux sensor 32 are set such that voltages detected by the first detecting unit 61 and the second detecting unit 62 (refer to FIG. 1) are smaller than a maximum allowable voltage for the first detecting unit 61 and the second detecting unit 62.

For example, in a case where a voltage detected by the second detecting unit 62 is larger than a voltage detected by the first detecting unit 61, the number of the contact points 106 and 107 of the first heat flux sensor 31 is larger than the number of the contact points 106 and 107 of the second heat flux sensor 32. That is, in a case where distribution (large or small) of heat flux is known in advance, the number of contact points in each heat flux sensor is set so as to be close to the maximum allowable voltage for each detecting unit. Thus, voltages from all the heat flux sensors are close to a maximum voltage.

Accordingly, in the heat flux measurement system 100H, the number of the contact points 106 and 107 in each heat flux sensor at a position where greater heat flux (temperature difference between the front surface 104a and the back surface 104b of the sensor body 104) occurs is set such that exceeding an upper limit of a voltage that can be detected by each detecting unit is avoided, and the number of the contact points 106 and 107 in each heat flux sensor at a position where smaller heat flux (temperature difference between the front surface 104a and the back surface 104b of the sensor body 104) occurs is made large up to an upper limit of a voltage that can be detected by each detecting unit. Therefore, it is possible to improve the accuracy of measurement.

It is possible to estimate in advance how great heat flux occurs for each position of a measuring target based on analysis and past measurement results. Based on the estimation, it is possible to determine the number N of contact points 106 and 107 of each of the heat flux sensors 31 to 51. The number N may be set such that a voltage of approximately 75 to 100% of a value of a maximum allowable voltage for each detecting unit that detects a voltage of each of the heat flux sensors 31 to 51 can be generated.

Although the embodiments of the present invention have been described in detail with reference to the drawings hereinbefore, each of configurations in each embodiment and a combination thereof are merely examples, and addition, omission, substitution, and other change of configurations are possible without departing from the gist of the present invention. In addition, the present invention is not limited by the embodiments, and is limited only by the claims.

For example, a circuit formed by each of the wires is not limited to the case described above, and any circuit may be used insofar as a plurality of heat flux sensors can be disposed such that the heat flux sensors do not mix and detect voltages when detecting a voltage by each detecting unit.

INDUSTRIAL APPLICABILITY

In the heat flux measurement system described above, heat flux distribution of a measuring target can be obtained with a smaller number of wires.

REFERENCE SIGNS LIST 1 first wire
2 second wire
3 third wire
4 fourth wire
5 fifth wire
6 sixth wire
7 seventh wire
8 eighth wire
9 ninth wire
10 tenth wire
11 eleventh wire
12 twelfth wire
13 thirteenth wire
14 fourteenth wire
15 fifteenth wire
16 sixteenth wire
17 seventeenth wire
18 eighteenth wire
19 nineteenth wire
20 twentieth wire
21 twenty-first wire
31 first heat flux sensor
32 second heat flux sensor
33 third heat flux sensor
34 fourth heat flux sensor
35 fifth heat flux sensor
36 sixth heat flux sensor
37 seventh heat flux sensor
38 eighth heat flux sensor
39 ninth heat flux sensor
40 tenth heat flux sensor
41 eleventh heat flux sensor
42 twelfth heat flux sensor
43 thirteenth heat flux sensor
44 fourteenth heat flux sensor
45 fifteenth heat flux sensor
46 sixteenth heat flux sensor
47 seventeenth heat flux sensor
48 eighteenth heat flux sensor
49 nineteenth heat flux sensor
50 twentieth heat flux sensor 51 twenty-first heat flux sensor
61 first detecting unit
62 second detecting unit
63 third detecting unit
64 fourth detecting unit
65 fifth detecting unit
100, 100A, 100B, 100C, 100D, 100E, 100F, 100G, 100H heat flux measurement system
102, 102F measurement equipment
103, 103F, 103F1, 103F2, 103F3 measuring unit
104 sensor body
104a front surface
104b back surface
105 thermocouple
105a first metal wire
105b second metal wire
106, 107 contact point
108, 108D, 108E electrical lead
111 first electrical lead
112 second electrical lead
120 auxiliary wire
120a first auxiliary wire
120b second auxiliary wire
120c third auxiliary wire

The invention claimed is:

1. A heat flux measurement system comprising:
a first wire;
only one first heat flux sensor provided in a middle of the first wire;
a second wire having a first end, connected to a first end side of the first wire extending from the first heat flux sensor, wherein the second wire is made of the same material as the first wire;
only one second heat flux sensor provided in a middle of the second wire;
a first detecting unit configured to detect a voltage between both ends of the first wire; and
a second detecting unit configured to detect a voltage between the first end of the first wire and a second end of the second wire.

2. The heat flux measurement system according to claim 1, further comprising:
a measurement equipment connected to the first detecting unit and the second detecting unit,
wherein the measurement equipment is selectively switchable as to taking in a voltage between the first detecting unit and the second detecting unit.

3. The heat flux measurement system according to claim 2,
wherein the measurement equipment has a plurality of measuring units of which a measurement accuracy differs according to a range of a voltage detected by each of the first detecting unit and the second detecting unit, and
a first measuring unit of the plurality of measuring units is configured to measure a value of the voltage detected by each of the first detecting unit and the second detecting unit with a highest accuracy, and is selectable according to the value of the voltage.

4. The heat flux measurement system according to claim 1, further comprising:
a third wire having a first end, connected to a second end side from the second heat flux sensor of the second wire, and made of the same material as the first wire;
only one third heat flux sensor in a middle of the third wire; and
a third detecting unit configured to detect a voltage between the second end of the second wire and a second end of the third wire.

5. The heat flux measurement system according to claim 4, further comprising:
a fourth wire having a first end, connected at a position on the second end side from the second heat flux sensor of the second wire and closer to the second heat flux sensor than to the first end of the third wire, is the fourth wire being made of the same material as the first wire;
only one fourth heat flux sensor provided in a middle of the fourth wire; and
a fourth detecting unit configured to detect a voltage between the second end of the second wire and a second end of the fourth wire.

6. The heat flux measurement system according to claim 1,
wherein each of the first heat flux sensor and the second heat flux sensor has:
a sensor body that is a thermal resistor, and
a thermocouple continuously disposed over a front surface and a back surface of the sensor body and including a plurality of contact points on the front surface and the back surface,
wherein the thermocouple of the first heat flux sensor is connected to the first wire, and
wherein the thermocouple of the second heat flux sensor is connected to the second wire.

7. The heat flux measurement system according to claim 6,
wherein the contact points disposed on the front surface of the sensor body and the contact points disposed on the back surface of the sensor body are provided side by side in a direction of heat flux, which is a measuring target.

8. The heat flux measurement system according to claim 6,
wherein the first wire and the second wire are made of a material different from the thermocouple.

9. The heat flux measurement system according to claim 6,
wherein a quantity of the contact points disposed on the front surface of the sensor body is the same as a quantity of the contact points disposed on the back surface.

10. The heat flux measurement system according to claim 9,
wherein the quantities of the contact points of the first heat flux sensor and the second heat flux sensor are set such that voltages detected by the first detecting unit and the second detecting unit are smaller than a maximum allowable voltage for the first detecting unit and the second detecting unit.

11. The heat flux measurement system according to claim 6,
wherein the thermocouple has a first metal wire and a second metal wire which are joined by contact points, and
the first wire and the second wire are connected to the first metal wire and are made of the same material as the first metal wire.

12. The heat flux measurement system according to claim 11, further comprising:
an electrical lead connecting the first wire to the first detecting unit and connecting the second wire to the second detecting unit, wherein the electrical lead is made of the same material as the first wire, the second wire, and the first metal wire.

13. The heat flux measurement system according to claim 11, further comprising:
an electrical lead connecting the first wire to the first detecting unit and connecting the second wire to the second detecting unit,
wherein the electrical lead includes:
a first electrical lead made of the same material as the first wire, the second wire, and the first metal wire, and is connected to the first wire and the second wire, and
a second electrical lead made of a material different from the first wire, the second wire, and the first metal wire, and connecting the first electrical lead to the first detecting unit and the second detecting unit.

14. The heat flux measurement system according to claim 11,
wherein at least one of the first wire and the second wire has an auxiliary wire connected at a position where the first heat flux sensor and the second heat flux sensor are not provided, and the auxiliary wire is made of a material different from the material of the first wire and the second wire.

* * * * *